June 9, 1936.  F. E. BACHMAN  2,043,421
WHEEL AND AXLE ASSEMBLY
Filed Aug. 1, 1931  5 Sheets-Sheet 2
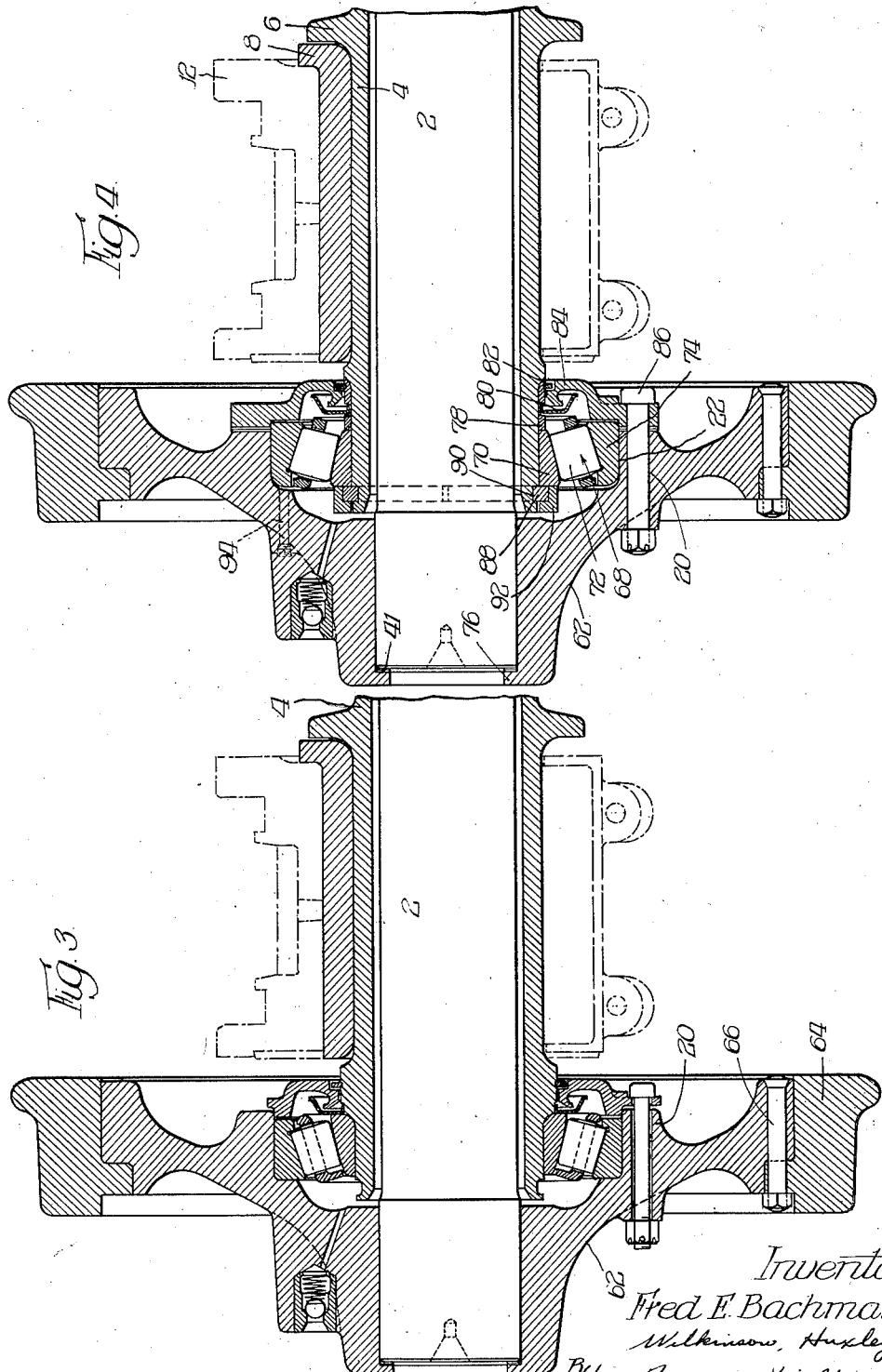
Inventor:
Fred E. Bachman,
Wilkinson, Huxley,
Byron & Knight attys.

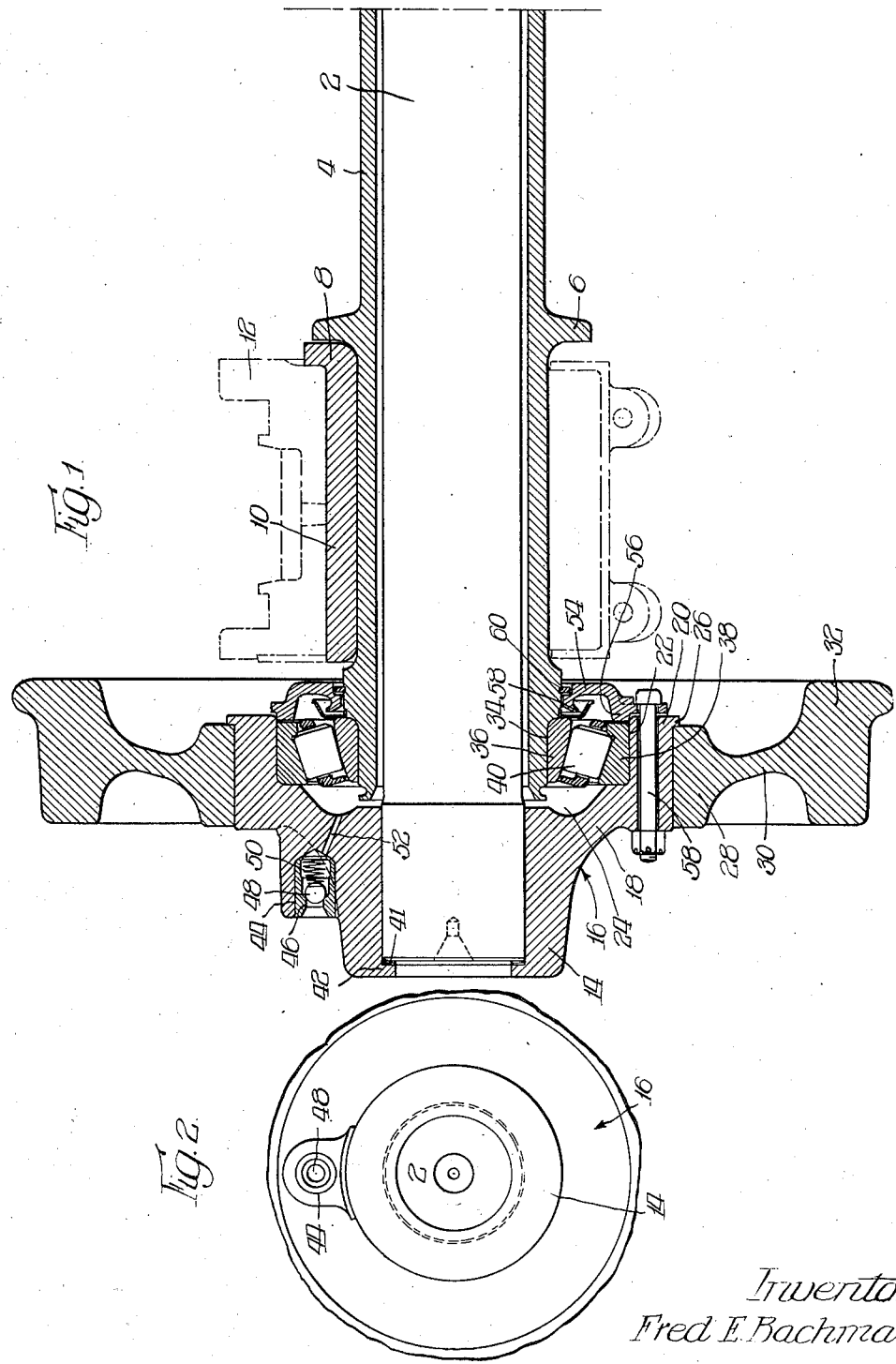

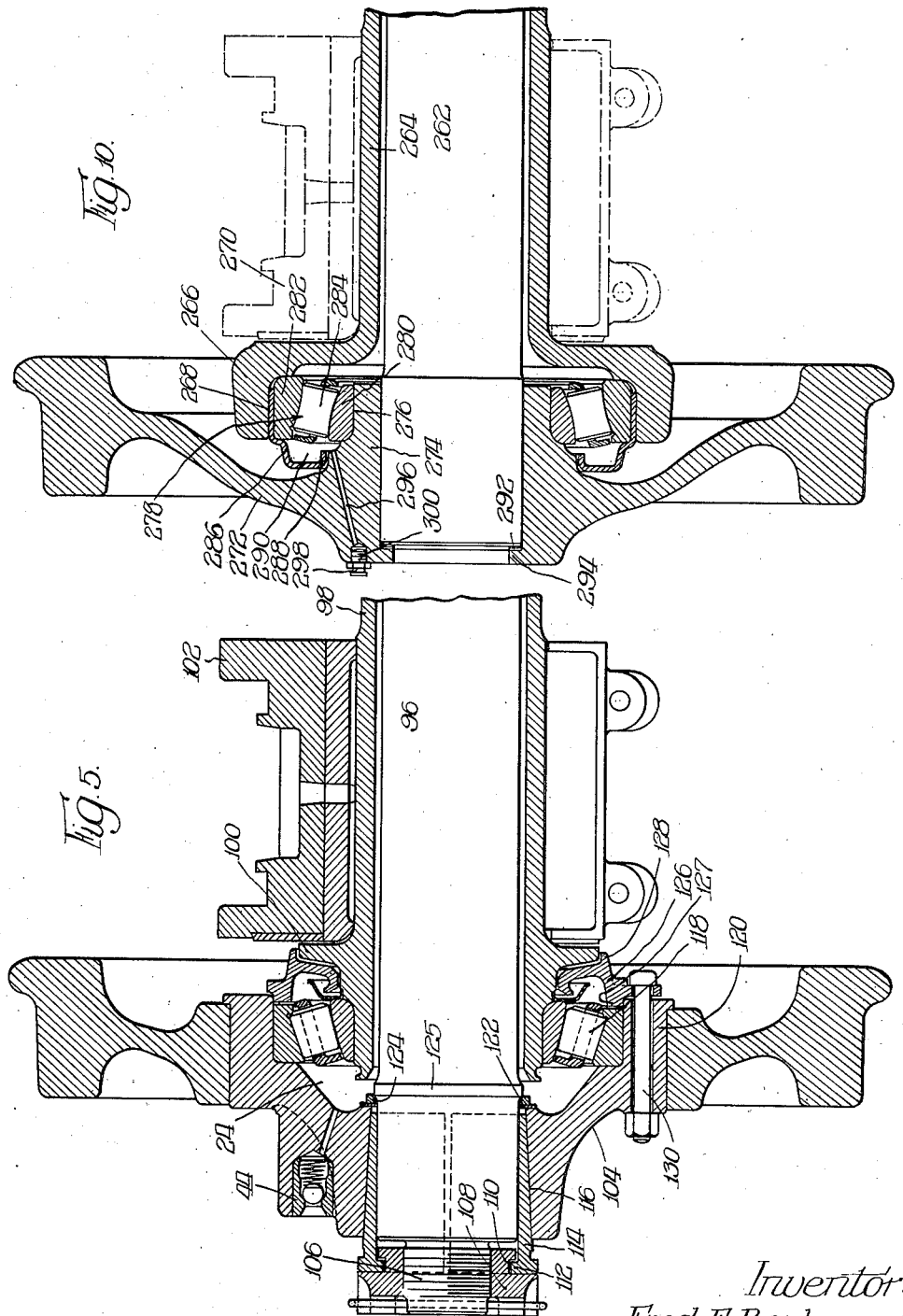

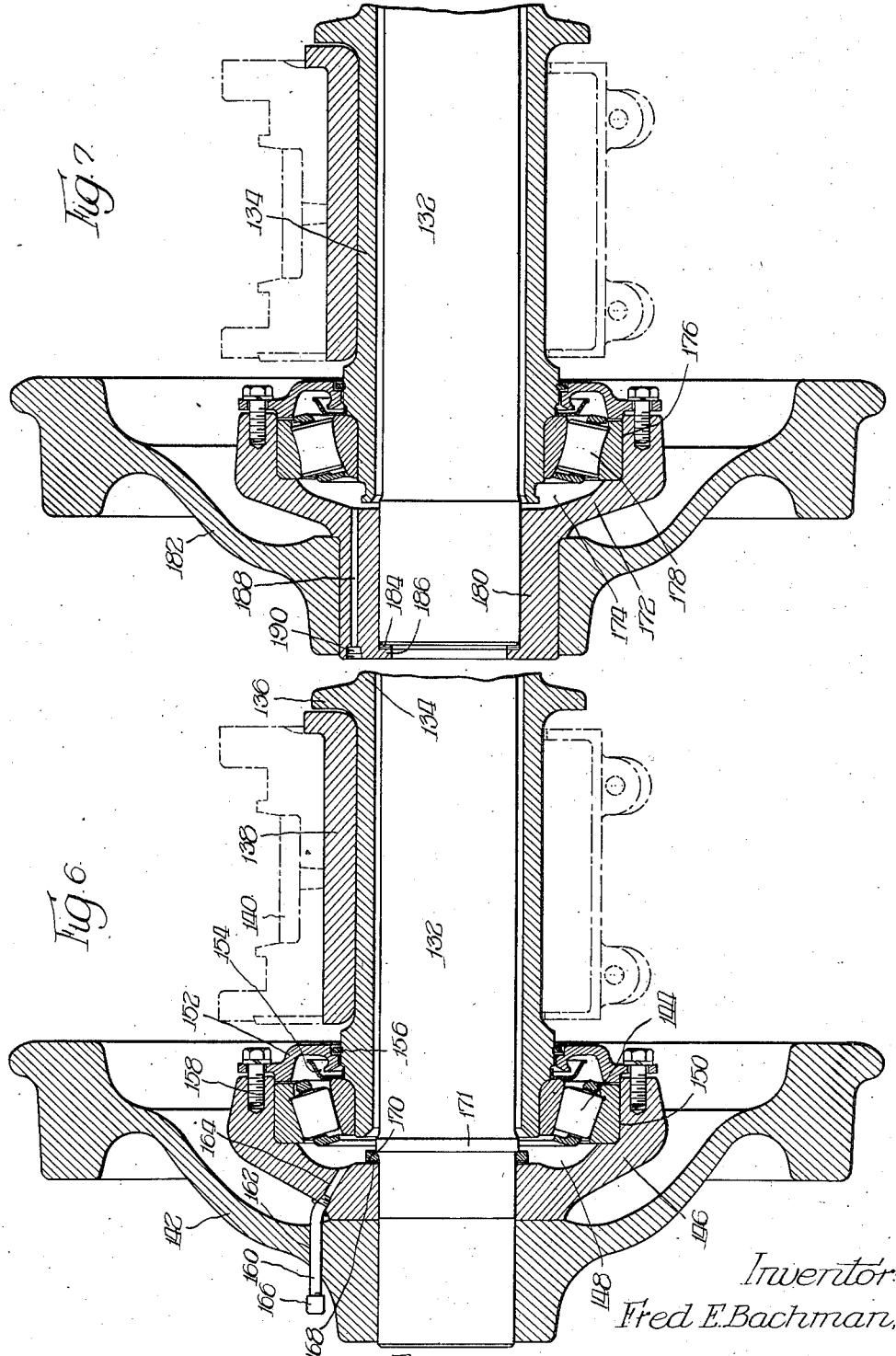

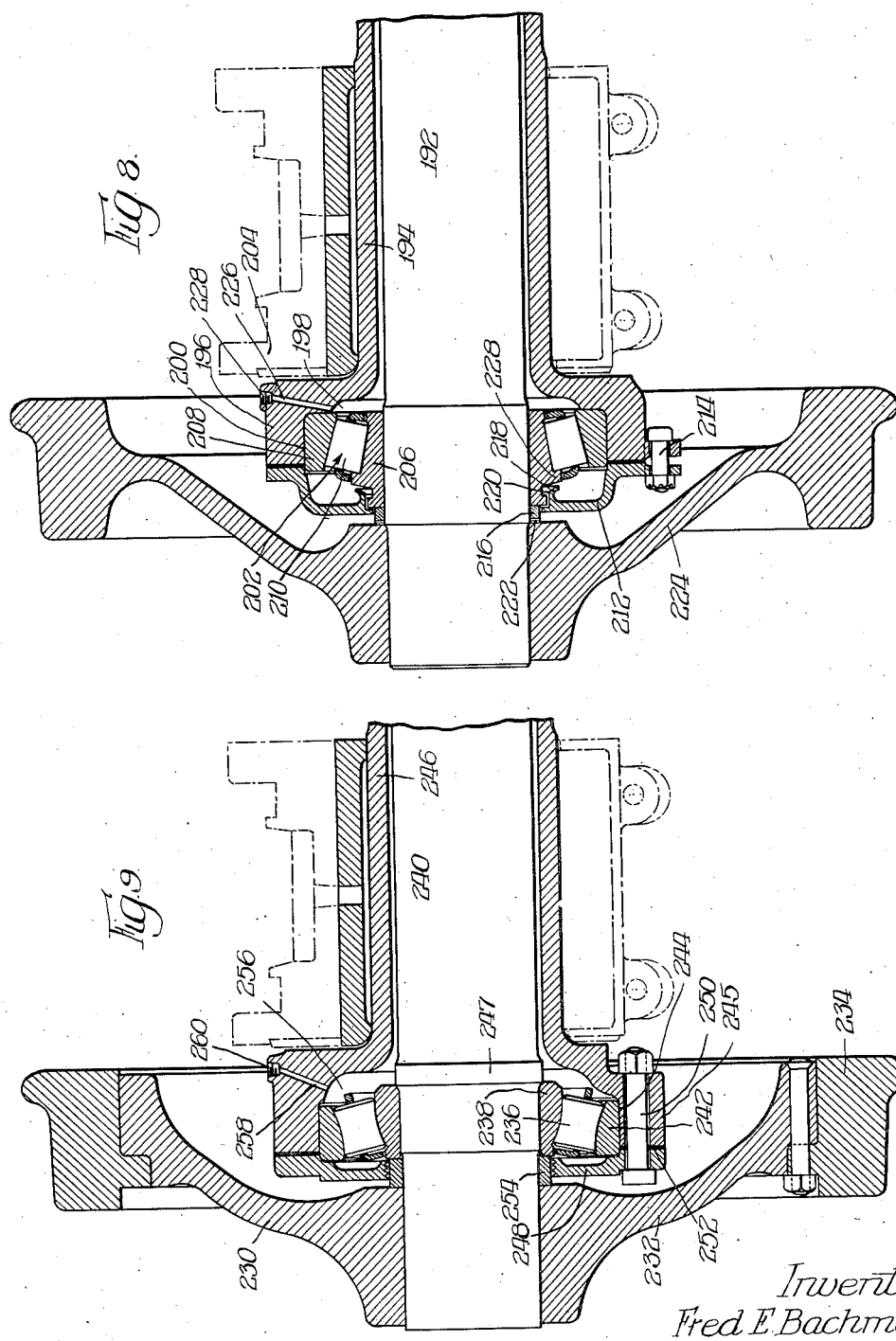

Patented June 9, 1936

2,043,421

UNITED STATES PATENT OFFICE 2,043,421

WHEEL AND AXLE ASSEMBLY

Fred E. Bachman, Chicago, Ill., assignor to American Steel Foundries, Chicago, Ill., a corporation of New Jersey Application August 1, 1931, Serial No. 554,481

15 Claims. (Cl. 295—36)

The present invention relates to wheel and axle assemblies, and more particularly to roller bearing assemblies for locomotive trucks.

Among the objects of the present invention is to provide a novel wheel and axle assembly including an anti-friction bearing means and a friction bearing means adapted to function in case of failure of the anti-friction bearing means.

Another object of the present invention is to provide a novel wheel and axle assembly adapted for use in locomotive constructions in which the truck frames thereof are between the wheels of the assembly.

The present invention contemplates the idea of providing a roller bearing wheel and axle assembly adapted for use in existing front trucks of locomotives in which the truck frame is between the wheels. The invention includes the idea of providing a friction bearing means operable upon failure of the roller bearing means to carry the weight of the trucks.

A still further object of the invention is to provide a novel roller bearing wheel and axle assembly in which the anti-friction or roller bearing means is positioned within the planes of the wheel of the assembly, whereby the loads carried by the axle assembly are transferred through such bearing means directly to the wheel and within the planes defining the edges thereof, the loads thereby being directly transmitted to the rails.

A still further object of the invention is to provide a wheel and axle assembly of improved type which may readily be applied to existing locomotives to convert the present type of truck to one of the roller bearing type, but without the necessity of making any changes in the engine trucks.

The invention further comprehends the idea of providing roller bearing units in a wheel and axle assembly for locomotives, such units being mounted in a housing which provides a bearing recess for the units, the tightness of the bearing adjustment being obtained by the adjustment of the wheel upon the axle of the assembly.

A still further object of the invention is to provide a wheel and axle assembly of the roller bearing type having an axle housing adapted to have engagement with a journal box to prevent relative movement thereof except upon failure of the roller bearing means.

Still another object of the present invention is to provide a novel wheel and axle assembly having an axle housing adapted to engage with a journal box or bearing therefor in a locomotive frame for taking up and transferring lateral thrusts thereto and to prevent movement of the housing except upon failure of the roller bearing units for the assembly.

The invention further includes the idea of providing a wheel and axle assembly having a roller bearing unit having the large end of the rollers at the outer end of the assembly, novel means being provided for retaining and positioning the roller bearing unit.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a view in cross-section of a wheel and axle assembly embodying the present invention;

Figure 2 is an end view in elevation of the embodiment shown in Figure 1 of the drawings;

Figure 3 is a view in cross-section of another wheel and axle assembly embodying the present invention;

Figure 4 is a view in cross-section of still another wheel and axle assembly, embodying the present invention;

Figure 5 is a still further wheel and axle assembly embodying the present invention;

Figure 6 is a view in cross-section of still another wheel and axle assembly, embodying the present invention;

Figure 7 is a view in cross-section of still another embodiment incorporating the present invention;

Figure 8 is a view in cross-section of a still further wheel and axle assembly embodying the present invention;

Figure 9 is a view in cross-section of another wheel and axle assembly incorporating still further another embodiment of the present invention; and Figure 10 is a view in cross-section of another wheel and axle assembly disclosing a still further embodiment of the present invention.

Referring now more in detail to the drawings, an embodiment of the present invention is disclosed in connection with a wheel and axle assembly, particularly adapted for locomotive truck constructions and comprising an axle 2 enclosed or housed within a casing or tubular member 4 provided with a laterally extending annular flange 6, adapted to have contacting engagement with an upstanding flange or lug 8 of a friction bearing 10 mounted thereon of an engine truck journal box 12, the flange 6 being adapted to transfer or transmit lateral thrusts from the housing 4 to the bearing 10 and thence to the journal box 12.

Mounted upon the outer end of the axle 2 is a hub 14 of a wheel, generally referred to as 16, this hub 14 being provided with a housing 18 including a bearing receiving member 20 providing a bearing recess 22 and a lubricant recess 24. The bearing receiving member 20 is provided with a limiting flange 26 adapted to position the hub member 28 of the outer wheel portion having a short diaphragm 30 and an integral rim and flanged tread portion 32.

The housing 4 for the axle 2 is provided with a bearing recess 34 adapted to have a roller bearing cone 36 pressed or shrunk thereon, while a roller bearing cup 38 is provided in the recess 22 of the member 20, roller bearings 40 being positioned between the cone 36 and cup 38. The adjustment of the roller bearing unit between the member 20 and housing 4 is effected by means of selecting shims 41 of the proper thickness which are adapted to be positioned between the outer end of the axle 2 and the overhanging flange 42 of the wheel hub 14, the hub 14 being pressed on the end of the axle 2, whereby the flange 42 comes into engagement with the shims 41 for properly adjusting the tightness of the roller bearing unit.

Any suitable lubricant may be fed into the lubricant chamber 24 and about the roller bearing unit through an oil plug 44 provided with an opening 46 normally closed by a ball-bearing 48 urged into the opening 46 by means of a coil spring 50, a duct 52 communicating with the plug opening 46 and the lubricant recess 24.

The lubricant recess 24 and bearing recess 22 are normally closed by a closure member or plate 54, having a flange 56 fitting within the recess 22, this plate being held against movement by a plurality of bolts 58 passing through the member 20 and engaging with the plate. The plate 54 is adapted to fit around deflectors 58 and baffle rings 60 fitting around the housing 4.

It will be observed that the roller bearing unit is positioned between the member 20 of the wheel and a bearing portion provided on the axle housing 4, the unit of this embodiment, as well as those in the embodiments to be hereinafter described, being located within the planes of the wheel, i. e., planes through or defining the edges of the wheel rim and tread portion. Loads are thereby transferred directly from the axle housing to the wheel within planes defining the application of these loads to the rails of the roadbed. Should the roller bearing unit for any reason fail, the housing 4 is adapted to have a rotary bearing relation with the frictional bearing 10 to prevent injury to the wheel and axle assembly.

In Figure 3 of the drawings, another embodiment of the present invention is disclosed, the same varying from the embodiment shown in Figures 1 and 2 of the drawings, in that the wheel of the assembly is shown as comprising a wheel center 62 having a flanged tread portion 64 fitting therewith and secured thereto by means of a plurality of bolt members 66. As in the previously described embodiment, the wheel is provided with a bearing receiving portion 20 adapted to position a roller bearing unit between the same and the housing 4 for the axle 2.

In Figure 4 of the drawings is shown still another embodiment of the present invention which comprises an axle 2 enclosed or encased within the housing 4 provided with flanges 6 adapted to contact with and transfer lateral thrusts to a friction bearing 18 of the engine journal box 12, the axle 2 having a wheel 62 corresponding with the wheel construction disclosed in Figure 3 of the drawings.

This embodiment varies from the previously described embodiments of the invention, in that the roller bearing unit 68 is turned end for end so that the enlarged ends of the rollers are disposed oppositely to the enlarged ends of the rollers of the other structures and toward the outer end of the wheel and axle assembly. The roller bearing unit comprises a roller bearing cone 70 fitting around the axle housing 4, rollers 72, and a roller bearing cup 74 fitting within the recess 22 of the bearing receiving member 20. The roller bearing cup 74 is adjustably positioned for tightening the bearing adjustment of the roller bearing unit by means of the proper selection of shims 41 between the end of the axle 2 and the inturned flange 76 of the wheel 62. The roller bearing cone 70 is positioned in one direction upon the axle 4 by means of contacting engagement with a sleeve 78 fitting around the axle 4 and adapted to cooperate with deflectors 80 and baffle rings 82 for preventing leakage of oil between the axle and a closure plate 84 normally secured to the wheel 62 by means of bolts 86.

The outer edge of the roller bearing cone 70 is adapted to engage with a split ring 88 fitting within an annular groove 90 provided in the housing 4, this split ring being held in place by means of a band 92 shrunk or pressed onto the axle 4. The roller bearing cup 74 may be removed from the wheel 62 by means of tools inserted through a plurality of openings 94 provided in the wheel 62.

In Figure 5 of the drawings, the invention is disclosed in connection with a wheel and axle assembly comprising an axle 96 enclosed or housed within a housing 98 provided with a flange 100 adapted to have contacting engagement with the outer face of the journal box 102, the axle 96 having a wheel 104 of a construction quite similar to the wheel 16 of the embodiment disclosed in Figures 1 and 2 of the drawings mounted thereon at its outer end. This axle 96 is provided with a threaded end portion 106 adapted to receive a nut 108 threaded thereon and provided with an annular recess 110 adapted to engage with flanges 112 of a split tapered or wedge sleeve 114 adapted to fit over the axle 96 and be received within the tapering bore 116 of the hub of the wheel 104.

A roller bearing unit 118, similar to the unit disclosed in Figures 1 and 2, is mounted between the housing 98 and the bearing receiving portion 120 of the wheel 104 and the same is adjusted in this position by means of selectively inserting shims 122 between the inner face of the hub of the wheel and a spacing ring 124 fitting around the axle 96 and engaging a collar 125. It will be quite apparent that upon movement of the nut 108, the sleeve 114 may be moved for adjusting the position of the wheel 104 relative to the axle 96 and through the medium of the shims 122 adjusting the tightness of the roller bearing unit 118.

As in the embodiment disclosed in Figure 1 of the drawings, a lubricant may be inserted into the lubricant recess 24 through the lubricant plug 44, the lubricant recess 24 and bearing recess for the bearing unit 118 being normally closed by a closure plate 126 provided with a flange 127, the plate also having a flange 128 engaging with the flange 100 of the housing 98 and normally retained in position by a plurality of bolts 130 passing through the bearing receiving member 120 of the wheel 104.

In Figure 6 of the drawings is disclosed still another embodiment of the present invention and is shown as comprising an axle 132 enclosed within a housing 134 provided with a flange 136 adapted to have contacting relation with a frictional bearing 138 of a journal box 140, this axle 132 having a wheel 142 mounted upon its outer end. In this embodiment, the roller bearing unit 144 is mounted between the housing 134 and an auxiliary bearing receiving member 146 adapted to be mounted upon the axle 132 and adjacent the hub of the wheel 142. This auxiliary member 146 is so constructed as to provide a lubricant chamber 148 and a bearing recess 150 normally closed by a closure plate 152 fitting around the housing 134 and cooperating with deflectors 154 and a baffle ring 156 for preventing leakage of oil between the same and the axle 134, this plate being secured to the auxiliary member by means of a plurality of bolts 158. Access to the lubricant chamber 148 is gained by means of a lubricant duct 160 passing through an opening 162 in the diaphragm of the wheel 142 and screw threaded in the member 146 and communicating with a duct or opening 164 passing therethrough and into the lubricant chamber 148, the duct 160 being normally closed by a fitting 166. Adjustment of the roller bearing unit 144 is effected through the proper selection of shims 168 positioned between the hub of the auxiliary member 146 and a ring or collar 170 shrunk or pressed onto the axle 132 and engaging the collar 171 of the axle 132.

In the embodiment disclosed in Figure 7 of the drawings, the wheel and axle assembly incorporating the present invention is of a construction quite similar to that disclosed in Figure 6 of the drawings and varies therefrom, in that the auxiliary member 172 providing a lubricant recess 174 and bearing recess 176 for the roller bearing unit 178, is provided with a hub 180 adapted to receive the hub of the wheel 182. The roller bearing unit 178 is adjusted between the auxiliary member 172 and the housing 134 by means of the proper selection of shims 184 between the end of the axle 132 and inturned flanges 186 provided on the hub 180 of the auxiliary member 172. Access to the lubricant chamber 174 is effected through the lubricant duct 188 passing through the hub 180 of the auxiliary member 172, which is normally closed by a plug 190 threadedly engaging in the enlarged threaded end thereof.

In Figure 8 of the drawings is disclosed still another wheel and axle assembly disclosing the present invention, the same being shown as comprising an axle 192 enclosed or encased within a housing 194 which is provided with an enlarged outwardly extending part or portion 196, providing a lubricant recess 198 and recess 200 for receiving a roller bearing unit 202, this housing being adapted to engage with the outer surface of a journal box 204 for transfer of lateral thrusts thereto.

The roller bearing unit 202 comprises a roller bearing cone 206 fitting on the axle 192 and a roller bearing cup 208 between which and the cone 206 are provided roller bearings 210. The lubricant recess 198 and bearing recess 202 are normally closed by a plate 212 secured to the housing part or portion 196 by means of a plurality of bolts 214, this plate 212 being adapted to fit around a retaining ring or collar 216 fitting on the axle 192 and being provided with a flange 218 overhanging a channel or groove 220 of the roller bearing cone 206. Adjustment of the roller bearing unit 202 is effected by the introduction of suitable shims 222 between the hub of a wheel 224 pressed on the axle 192 and the retaining sleeve or collar 216. A suitable lubricant may be introduced into the lubricant chamber 198 through a lubricant duct 226 provided in the part or portion 196, this duct 226 being normally closed by a plug 228 threaded in the enlarged threaded end of the duct 226. In this embodiment, it will be seen that the roller bearings 210 have their enlarged ends turned end for end from their normal position, as shown in certain of the other embodiments, and are engaged and retained in position by contacting engagement with the flanges 228 provided on the roller bearing cone 206.

In the embodiment disclosed in Figure 9 of the drawings, the wheel and axle assembly disclosed therein is of a similar construction to that disclosed in Figure 8 of the drawings and varies therefrom, in that the wheel 230 comprises a wheel center 232 and a flange tire and tread portion 234.

Further, the roller bearing unit 236 comprises a roller bearing cone 238 pressed onto the axle 240 and a roller bearing cup 242 fitting within a recess 244 of the enlarged end portion 245 of a housing 246 for enclosing the axle 240, this roller bearing cup 242 being positioned within the recess 244 by means of the contacting relation therebetween and a closure plate 248, this closure plate 248 being secured to the enlarged end portion 245 as by means of bolts 250. By the proper selection of shims 252, the position of the roller bearing cup 242 may be adjusted within the recess 244, while the roller bearing cone 238 is adjusted or retained in position upon the axle 240 and into engagement with the collar 247 through a collar or sleeve 254 positioned between the cone 238 and the hub of the wheel 230. Access to a lubricant recess 256 and the bearing recess 244 within the housing portion 245 is effected through a lubricant duct 258 normally closed by a plug 260 threaded in the enlarged threaded end thereof.

In Figure 10 of the drawings is disclosed still another embodiment of the invention which is shown as comprising an axle 262 enclosed within a housing 264 of a construction quite similar to the housing 194 and 246 of Figures 8 and 9, respectively. This housing 264 is provided with an enlarged portion 266 providing a bearing recess 268, this enlarged portion 266 being adapted to contact with the outer face of a journal box 270 for transfer of lateral thrusts thereto. Mounted upon the outer end of the axle 262 is a wheel 272 provided with a hub 274 having a bearing receiving portion 276, a roller bearing unit 278 being provided therebetween and the enlarged portion 266 of the housing 264. This roller bearing unit comprises a roller bearing cone fitting around the bearing portion 276 of the hub 274, a roller bearing cup 282 and a plurality of roller bearings 284 operatively positioned therebetween. The bearing recess 268 is normally closed by a closure plate or member 286 having a part interposed between the enlarged portion 266 of the housing 264 and the roller bearing cup 282 for holding the same in position, and another part or portion having an inturned flange 288 fitting around the hub of the wheel 272 for providing a tight joint therebetween and providing a lubricant recess 290. The adjustment of the bearing unit 278 is effected through the proper selection of shims 292 fitting between the end of the axle 262 and an inwardly disposed flange 294 provided on the hub 274 of the wheel 272. Access to the lubricant chamber or recess 290 is effected through a duct 296 normally closed by a plug 298 threaded in the enlarged threaded end 300 thereof.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a car bearing, the combination of a wheel and axle assembly, said wheel having a hub and a bearing receiving portion fitting said axle, a housing for said axle, an anti-friction means between said portion and housing, and a closure member for said housing and fitting between the same and said means.

2. In a wheel and axle assembly, the combination of radially spaced axles, one of said axles being normally stationary and the other of said axles being normally rotative, a wheel having a hub mounted on one of said axles and being provided with a portion overhanging the end of the same, the other of said axles being provided with a housing having a bearing receiving portion, a closure member extending between said housing and hub and seating in said bearing receiving portion, a bearing assembly mounted between said hub and the seating part of said closure member, and means between the end of said wheel receiving axle and the overhanging portion of said hub for adjusting the same and said assembly.

3. In a car truck, the combination of a wheeled inner axle, an outer axle providing a housing for said inner axle, anti-friction bearings in cooperative relation with said axles, said outer axle cooperating with journal boxes through friction bearings inwardly of said wheels.

4. In a car truck, the combination of a wheeled inner axle, an outer axle providing a housing for said inner axle, anti-friction bearings in cooperative relation with said axles, and journal box assemblies associated with said outer axle and each having a journal bearing frictionally engaging the outer axle inwardly of a wheel.

5. In a car truck, the combination of a wheeled inner axle, an outer axle providing a housing for said inner axle, anti-friction bearings in cooperative relation with said axles, and journal box assemblies associated with said outer axle and each having a journal bearing frictionally engaging the outer axle inwardly of a wheel, said outer axle having radially disposed flanges engageable with the journal bearings of said assemblies for transfer of lateral thrusts from said axle to said assemblies.

6. In a car truck, the combination of a wheeled inner axle, an outer axle providing a housing for said inner axle, anti-friction bearings in cooperative relation with said axles, and journal box assemblies associated with said outer axle and each having a journal bearing frictionally engaging the outer axle inwardly of a wheel, said outer axle having radially disposed flanges engageable with the inner end of said journal bearings of said assemblies for transfer of lateral thrusts from said axle to said assemblies.

7. In a car truck, the combination of a wheeled inner axle, an outer axle providing a housing for said inner axle, anti-friction bearings in cooperative relation with said axles, and journal box assemblies associated with said outer axle and each having a journal bearing frictionally engaging the outer axle inwardly of a wheel, said outer axle having radially disposed flanges engageable with the outer end of said journal bearings of said assemblies for transfer of lateral thrusts from said axle to said assemblies.

8. In a car truck, the combination of a wheeled inner axle, an outer axle providing a housing for said inner axle, anti-friction bearings in cooperative relation with said axles, said outer axle cooperating with journal boxes through friction bearings inwardly of said wheels and having means for transferring lateral thrusts thereto.

9. In a car truck, the combination of a wheeled inner axle, an outer axle providing a housing for said inner axle, anti-friction bearings in cooperative relation with said axles, said outer axle cooperating with journal boxes through friction bearings inwardly of said wheels and having means for transferring lateral thrusts thereto, said friction bearings having means engageable by said first-named means for transferring said thrusts.

10. In a car truck, the combination of a wheeled inner axle, an outer axle providing a housing for said inner axle, anti-friction bearings in cooperative relation with said axles, said outer axle cooperating with journal boxes through friction bearings inwardly of said wheels, said friction bearings having lugs engaging said journal boxes, and flanges on said outer axle engageable with said lugs for transferring lateral thrusts to said journal boxes through said lugs.

11. In a car truck, the combination of a wheeled inner axle, an outer axle having enlarged bearing receiving portions, and anti-friction bearings between said portions and said inner axle, said outer axle cooperating with journal boxes through friction bearings inwardly of said wheels.

12. In a car truck, the combination of a wheeled inner axle, an outer axle having enlarged bearing receiving portions, anti-friction bearings between said portions and said inner axle, and journal box assemblies associated with said outer axle and each having a journal bearing frictionally engaging the outer axle inwardly of a wheel.

13. In a car truck, the combination of a wheeled inner axle, an outer axle, anti-friction bearings between said outer axle and each of said wheels, and journal box assemblies associated with said outer axle and each having a journal bearing frictionally engaging the outer axle inwardly of a wheel, said outer axle having flanges engageable with the journal bearings of said assemblies for transfer of lateral thrusts from said axle to said assemblies.

14. In a car truck, the combination of a wheeled inner axle, an auxiliary member disposed adjacent each of said wheels and provided with a bearing receiving portion, an outer axle, anti-friction bearings between said outer axle and each of said bearing receiving portions, and journal box assemblies associated with said outer axle and each having a journal bearing frictionally engaging the outer axle inwardly of a wheel, said outer axle having flanges engageable with the journal bearings of said assemblies for transfer of lateral thrusts from said axle to said assemblies.

15. In a car truck, the combination of a wheeled inner axle, an outer axle providing a housing for said inner axle, anti-friction bearings in said wheels and on said outer axle, and journal means cooperating with said outer axle inwardly of said wheels.

FRED E. BACHMAN.